United States Patent
Heusser et al.

(10) Patent No.: US 7,849,687 B2
(45) Date of Patent: Dec. 14, 2010

(54) ELECTROHYDRAULIC SOLAR PANEL CARRIER ADJUSTING DEVICE

(75) Inventors: Martin Heusser, Munich (DE); Hilarius Hundschell, Isen (DE)

(73) Assignee: HAWE Hydraulik GmbH & Co. KG, Munich (DE)

( * ) Notice: Subject to any disclaimer, the term of this patent is extended or adjusted under 35 U.S.C. 154(b) by 428 days.

(21) Appl. No.: 12/051,014

(22) Filed: Mar. 19, 2008

(65) Prior Publication Data
US 2008/0264363 A1 Oct. 30, 2008

(30) Foreign Application Priority Data
Apr. 27, 2007 (EP) .................... 07008707

(51) Int. Cl.
*F16D 31/02* (2006.01)
*F15B 13/04* (2006.01)

(52) U.S. Cl. .............. 60/406; 91/420; 91/439; 91/451

(58) Field of Classification Search ........... 60/403, 60/406; 91/420, 437, 438, 439, 440, 451; 126/604
See application file for complete search history.

(56) References Cited

U.S. PATENT DOCUMENTS

| | | | |
|---|---|---|---|
| 5,415,076 A | * | 5/1995 | Krone et al. .............. 91/439 |
| 5,760,695 A | * | 6/1998 | Huber .................... 91/494 |
| 7,104,181 B2 | * | 9/2006 | Bitter et al. ............... 91/451 |

FOREIGN PATENT DOCUMENTS

| | | |
|---|---|---|
| DE | 10022236 | 11/2001 |
| EP | 0803630 | 10/1997 |
| EP | 07008707 | 10/2007 |

* cited by examiner

*Primary Examiner*—Michael Leslie
(74) *Attorney, Agent, or Firm*—Cook Alex Ltd.

(57) ABSTRACT

A solar panel carrier T is provided at a sub-structure U such that it can be rotated and tilted by means of hydrostatic rotation and tilt motors M, M'. In an electrohydraulic adjusting device for the solar panel carrier T a motor pump aggregate 8 is connected to the hydrostatic motors. Within working lines A, B of the tilt hydrostatic motor M at least one tilt control system K is provided, which comprises valve components and a pilot pressure circuit. The tilt control system K comprises pressure actuated blocking valves or load holding valves $LHV_A$, $LHV_B$. For automatically adjusting a protected position S of the carrier T a suction line N is provided at the side of the hydrostatic tilt motor facing to the blocking valves or load holding valves. The suction line N is surveyed by a monitoring solenoid 18 and is opened depending on initial pressure conditions in case of switching off the electric power and/or in case of an electric breakdown. In this fashion the protected position S of the carrier T can be adjusted without consuming primary energy by use of the weight load of the carrier T itself.

13 Claims, 3 Drawing Sheets

ELECTROHYDRAULIC SOLAR PANEL CARRIER ADJUSTING DEVICE

BACKGROUND AND SUMMARY OF THE INVENTION

The invention relates to an electrohydraulic solar panel carrier adjusting device.

It is known in the technology of solar energy, e.g. in solar power plants, to install a plurality of solar panels in fixed positions. However, fixed positions are a compromise since both the position of the sun and the energy gain from the solar panels vary. In order to optimize the energy gain it is known to let the solar panels track the path of the sun by means of an electrohydraulic adjusting device. Then the primary energy input for operating the electrohydraulic adjusting device, of course, should be less than the energy gain achieved by tracking the path of the sun. These requirements put a relatively high load on the electrohydraulic adjusting device in terms of power consumption of electrical components of the device. A further important requirement aside from the necessity to adjust the carrier at any time, even in case of an electricity breakdown or during night time into the protected position, e.g. in case of danger of a storm or strong winds, in order to avoid damage to the solar panel or the adjusting device. In order to solve this problem it is known in practice to provide an autarkic electric power source, e.g. an automobile battery, to operate the motor pump aggregate and electrical components of the adjusting device independently from the mains and even in case of a power breakdown in the mains, to then adjust the protected position. The configuration of the solar panel and its sub-structure per se is such that the weight load of the solar panel including the carrier generates a permanent force in the direction towards the protected position at the sub-structure. The weight load can be used to adjust the protected position in case of a power breakdown and without power consumption of components of the adjusting device. However, this function means a displacement of hydraulic medium between the chambers of the hydrostatic tilt motor and, in some cases, needs to even draw hydraulic medium out of the motor pump aggregate to the hydrostatic tilt motor. This has not functioned satisfactorily in practice up to now, due to e.g. the flow resistance in long connecting lines. Furthermore, when hydraulic medium was displaced between the chambers of the hydrostatic tilt motor, poorly defined hydraulic conditions resulted which make it extremely complicated to correctly re-start the adjusting device, e.g. after a power breakdown.

A hydraulic actuation assembly for a covering lid in a vehicle) known from EP-A-0 803 630, is designed such that in one embodiment the cover lid may be lowered only by the weight of the cover lid into a defined position. In this condition, a provided solenoid seat valve of the control system is de-energized. The pump is switched off. The lowering movement of the cover lid is decelerated by an aperture. The aperture can be adjusted and allows to finely tune the moving speed of the cover lid. However, an adjustment of the cover lid caused by the weight load only can be executed first when the limit pressure of a preloaded emergency valve is overcome. This complicates a rapid and safe adjustment of the cover lid.

DE-A-10 02 22 36 discloses a mechanical/hydraulic adjustment system for solar generators which track the movement of the sun about two axes. Load holding valves are arranged between the directional control valves of the hydrostatic motors and the pressure source or the tank, respectively. The load holding valves can be opened alternatively by hydraulic pilot pressure from the respective other working line. The electric motor driving the pump is supplied with electric power provided by the solar generator. In order to activate a braking system a directional control valve is arranged in a discharge line leading to the tank.

It is an object of the invention to provide an electrohydraulic adjusting device of this kind which can be operated with a small amount of electric power, which allows to adjust the protected position of the carrier even in the case of an electric power breakdown or in case that the electric power has been switched off intentionally, and which assures well-defined hydraulic conditions for a later re-start of the operation of the adjusting device.

During normal operation with sufficient available electric power the suction line is blocked. The adjusting device can be operated with low electrical input. Since the suction line is located very close to the hydrostatic tilt motor, with the monitoring solenoid automatically opening the suction line either in case of an electric power breakdown or when the electric power has been switched off intentionally, the acting weight load of the carrier and the solar panel will suffice to reliably bring the carrier relatively rapidly to the protected position, despite the fact that hydraulic medium has been displaced therefor. Since any displacement of hydraulic medium takes place between the chambers of the hydrostatic tilt motor either in case of an electric power breakdown or of an intended power switch-off, and independently from length dimensions of lines extending to the motor pump aggregate, poorly-defined hydraulic conditions will definitely be avoided for the later re-start of normal operations. The measure to permanently energize the monitoring solenoid during normal operation, and consequently open the suction line for low-resistance fluid flows in case of an electric power breakdown or when the electricity has been switched off, allows to dispense with an autarkic power supply, meaning cost reduction and fewer structures. As the monitoring solenoid has negligible power demand and does not influence normal operation of the adjusting device, the adjusting device can be operated with the minimum input of primary energy. The requirement is fulfilled easily to consume less primary energy for the sun tracking function than energy is gained by the sun tracking function.

In an expedient embodiment the permanently energized monitoring solenoid has a power consumption of only between about 1.5 volt to 6.0 volt, preferably to only about 3.0 volt. Such low power consumption of the monitoring solenoid is negligible as long as electric energy is available.

In an expedient embodiment the working lines extending between the hydrostatic tilt motor and the blocking valves or load holding valves are interconnected via a suction path from which a discharge line branches off which deviates the blocking valves or load holding valves. A respective pilot pressure operated multi-way seat valve is arranged in the suction path and in the discharge line. The multi-way seat valves are pilot-pressure operated either from the suction path or the discharge line and thus do not consume electric power during operation. A pilot circuit of both multi-way seat valves is connected to the discharge line via an unloading branch. This unloading branch contains a solenoid seat valve having the monitoring solenoid as an actuator such that in case of either an intended power switch off or an electric power breakdown the solenoid seat valve will seek an open position due to the de-energized monitoring solenoid, to then operate the multi-way seat valves into the open position. Since the open solenoid seat valve situated in the unloading branch only has to pass a very small pilot quantity of the hydraulic medium, the solenoid seat valve can be small and well-responsive which allows to use a monitoring solenoid with an extremely low power demand. In case of a hydrostatic tilt motor even with equally sized chambers the discharge line even may be dispensed with. To the contrary, i.e., in the case of differently sized chambers, the discharge line has the additional function to discharge a part of the hydraulic medium displaced between the chambers when the protected position is adjusted. With the latter-mentioned function, i.e. discharging at least a part of the hydraulic medium which is displaced between the chambers via the discharge line the hydrostatic tilt motor may be a differential cylinder the piston rod of which is fully retracted in the protected position such that the protected position is well-defined by a form-fit or a force-fit at an end position. The suction path is opened in suction direction from the piston side chamber to the piston rod side chamber such that the hydraulic medium displaced out of the piston side chamber keeps the piston rod side chamber full without creating poorly-defined hydraulic conditions, because excessive hydraulic medium from the piston side chamber directly is discharged via the discharge line e.g. to the motor pump aggregate. A hydrostatic tilt motor (one of several differential cylinders) further offers the advantages that due to differently sized pressure receiving surfaces the piston rod immediately will be extended (leaving the protected position) upon re-start of normal operation of the adjusting device, even if both working lines first have equal pressures before a true tilt control begins to work.

With a view to well-defined hydraulic conditions at the re-start of normal operation after the protected position has been adjusted, it may be expedient to arrange respective check valves in the suction path and in the discharge line with each check valve blocking in flow direction to the piston side chamber. These check valves may assist to occasionally blocking the carrier against wind load or unpredictable forces.

A further important feature is a lowering brake valve located in the discharge line. Specifically in case of a differential cylinder a partial volume has to be discharged when displacing hydraulic medium from the piston side chamber into the piston rod side chamber. The lowering brake valve accurately limits the speed of the piston into the protected position. In this way, a too rapid carrier movement can be avoided which otherwise may cause damage.

In a structurally simple way at least the suction line including the monitoring solenoid is integrated into a valve block which also contains the blocking valves or load holding valves. The valve block either is directly mounted at the hydrostatic tilt motor or is mounted at lest in direct vicinity of the hydrostatic tilt motor, i.e., in each case relatively distant from the motor pump aggregate. This structural principle is simple and saves mounting space at the hydrostatic tilt motor and assures short flow paths mainly for hydraulic medium which has to be displaced when the protected position is adjusted.

With a view to high functional safety and the minimum input of primary energy a closure member is provided in each multi-way seat valve in the suction path and in the discharge line. The closure member is loaded at an opening control side in opening direction and in closing direction at a closing control side by pilot pressure either taken from the suction path or from the discharge line. In some cases, even the respective pressure receiving surfaces of the closure member may have different sizes. Preferably, even a valve spring may be provided which urges the closure member in closing direction. The valve spring, however, may be relatively weak. Furthermore, an aperture may be provided between the suction path and the discharge line at one side and the closing control side of the respective multi-way seat valves at the other side. The closing control sides of both multi-way seat valves are connected to the monitoring solenoid actuated solenoid seat valve in the unloading branch. The closing control sides of both multi-way seat valves are connected via the solenoid seat valve in the unloading branch to a working line section extending to the motor pump aggregate. The passage cross-section of the open solenoid valve in the unloading branch is larger than the size of the respective aperture such that a pressure drop will be generated reliably and relatively rapidly by the aperture upon occurrence of an electric power breakdown or intended power switch off. This pressure drop switches the multi-way seat valves open to open the suction path and the discharge line. The hydrostatic tilt motor automatically will be smoothly brought to the protected position.

The size of the respective aperture e.g. may correspond to a bore of about 0.4 mm diameter, while the cross-section of the open solenoid seat valve may correspond to a bore of about 0.7 mm to 0.8 mm diameter instead.

Since, as mentioned, even during normal operation of the adjusting device the consumption of primary energy, i.e. electric energy, should be as low as possible, in order to maximize the energy gain resulting from the sun path tracking function. In a preferred embodiment the motor pump aggregate may contain a reversible electric motor and a pump discharging in both rotary directions. The reversible electric motor and the reversibly discharging pump so to speak may fulfil a directional control function of the adjusting device to dispense with an additional electric power-consuming solenoid actuated directional control valve. Furthermore, a pair of pilot pressure-operated ⅔-way valves and a pair of system pressure-limiting valves may be contained in the motor pump aggregate, which both operate without primary electric energy. The motor pump aggregate may be connected via a directional control slider valve either to the tilt control system of the hydrostatic tilt motor or to a rotation control system of the carrier, in order to selectively control needed adjustment steps (tilting steps or rotation steps) for the sun position tracking function. The directional control slider valve might consume electric energy, however, for the respective switchover only. The electric power consumption of the electric motor driving the pump is not changed significantly by the reversibility. The adjusting device in total can be operated with very little primary energy.

The power consumption of the solenoid of the directional control slider valve needed for the switchover between rotation steps and tilting steps may amount only to about 5 volt to 10 volt, preferably to only 8.0 volt. Expediently, the directional control slider valve then is held by spring force in the switching position for actuating the tilt control system (smaller consecutive tilting steps may be needed more often than consecutive rotation steps) and is switched over by the solenoid for a rotation step only for a short while. Overall, the principle of how the adjusting device is designed hydraulically and electrically results in an extremely favorable energy balance.

Expediently, several parallelly circuited hydrostatic tilt motors, in particular differential cylinders, may constitute the tilt control system. The motors are connected to a common tilt control. This "parallel" principle in some cases might lead to distortion of the carrier and/or the solar panel. If distortions should be excluded, several parallel hydrostatic tilt motors, in particular differential cylinders, might be used, each having a separate tilt control.

In order to assure that operation of the blocking valves or load holding valves in the respective two working lines do not consume electric energy when during normal operation hydraulic medium has to be displaced from one chamber of the hydrostatic tilt motor to the motor pump aggregate these valves expediently are controlled to open against spring force by pilot pressure taken from the respective other working line. In case of an electric power breakdown or when the adjusting device is not actuated, the blocking valves or load holding valves automatically will maintain blocking positions and hydraulically block the carrier in the initial position. For similar purposes, a hydraulically releasable braking device engaged by spring force may be provided in the rotation control system.

BRIEF DESCRIPTION OF THE DRAWINGS

Embodiments of the invention will be explained with the help of the drawing. In the drawing is.

DETAILED DESCRIPTION OF THE INVENTION

Figure 1:
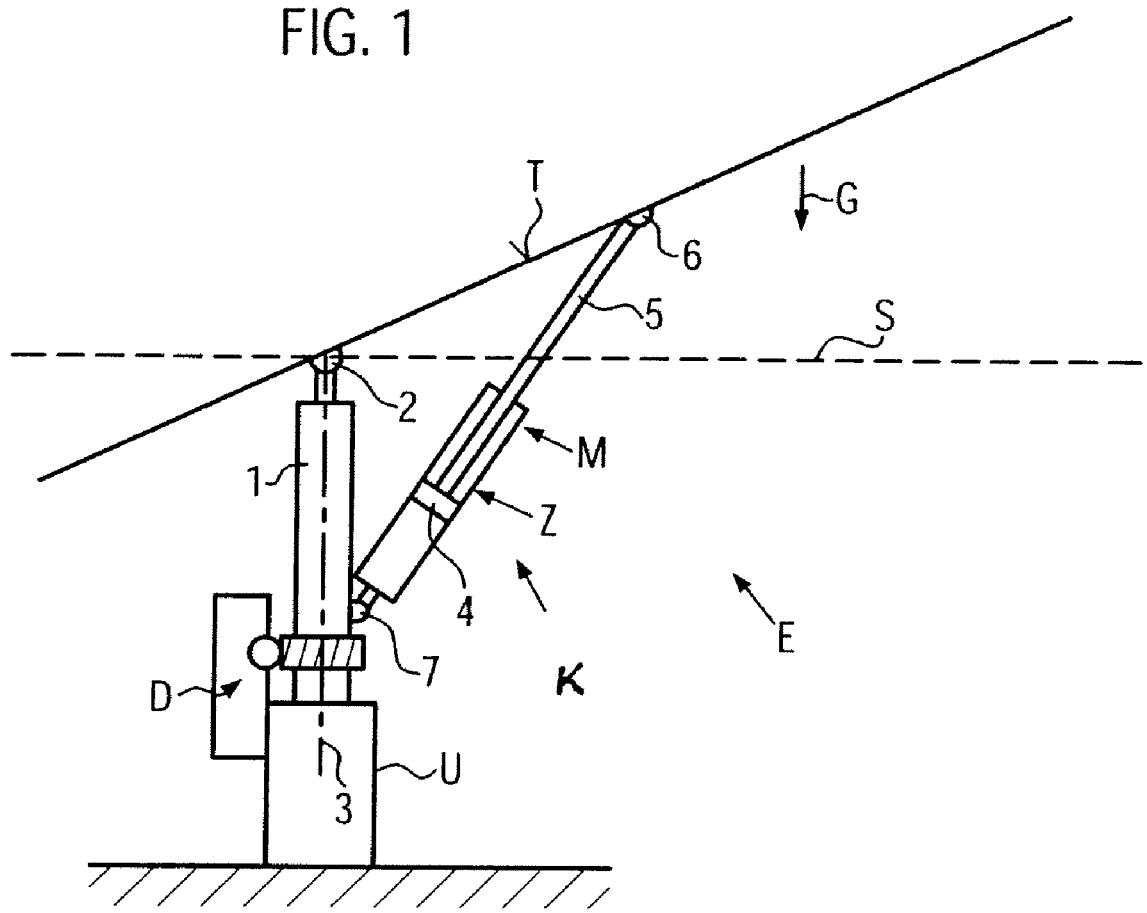
FIG. 1 is a schematic side view of a solar panel unit.

A solar panel unit shown in FIG. 1 comprises an e.g. plate-shaped carrier T for a single or for several not shown solar panels. A plurality of solar panel units may be installed in a solar power plant on the ground or on building surfaces. A fixed sub-structure U carries a column 1 which can be rotated about an axis 3 by means of a rotation control system D. The carrier T also can be tilted at a suspension 2 on top of the column 1 by a tilt control system K and can be rotated by rotating the column 1. The carrier T is suspended one-sided and such that it tends to seek and maintain by its own weight (gravitation GR) a protected position S (indicated as a horizontal dotted line), out of the shown position (a full line) in which the carrier e.g. is adjusted perpendicularly to the radiation of the sun. The protected position S e.g. is selected as a passive position when the solar panel unit is out of operation or in case of danger of a storm or strong wind in order to protect the solar panel unit against damage. The tilt control system K of the carrier T has at least one hydrostatic tilt motor M, e.g. a differential cylinder Z with a piston 4 and a piston rod 5 linked to the carrier T in a suspension 6. Depending on the size of the carrier T several suspensions 2, 6 and even several hydrostatic tilt motors M may be provided side by side, such that the hydrostatic tilt motors M either are circuited in parallel to a common tilt control system K or such (not shown) that each hydrostatic tilt motor M has a separate tilt control system K.

Figure 2:
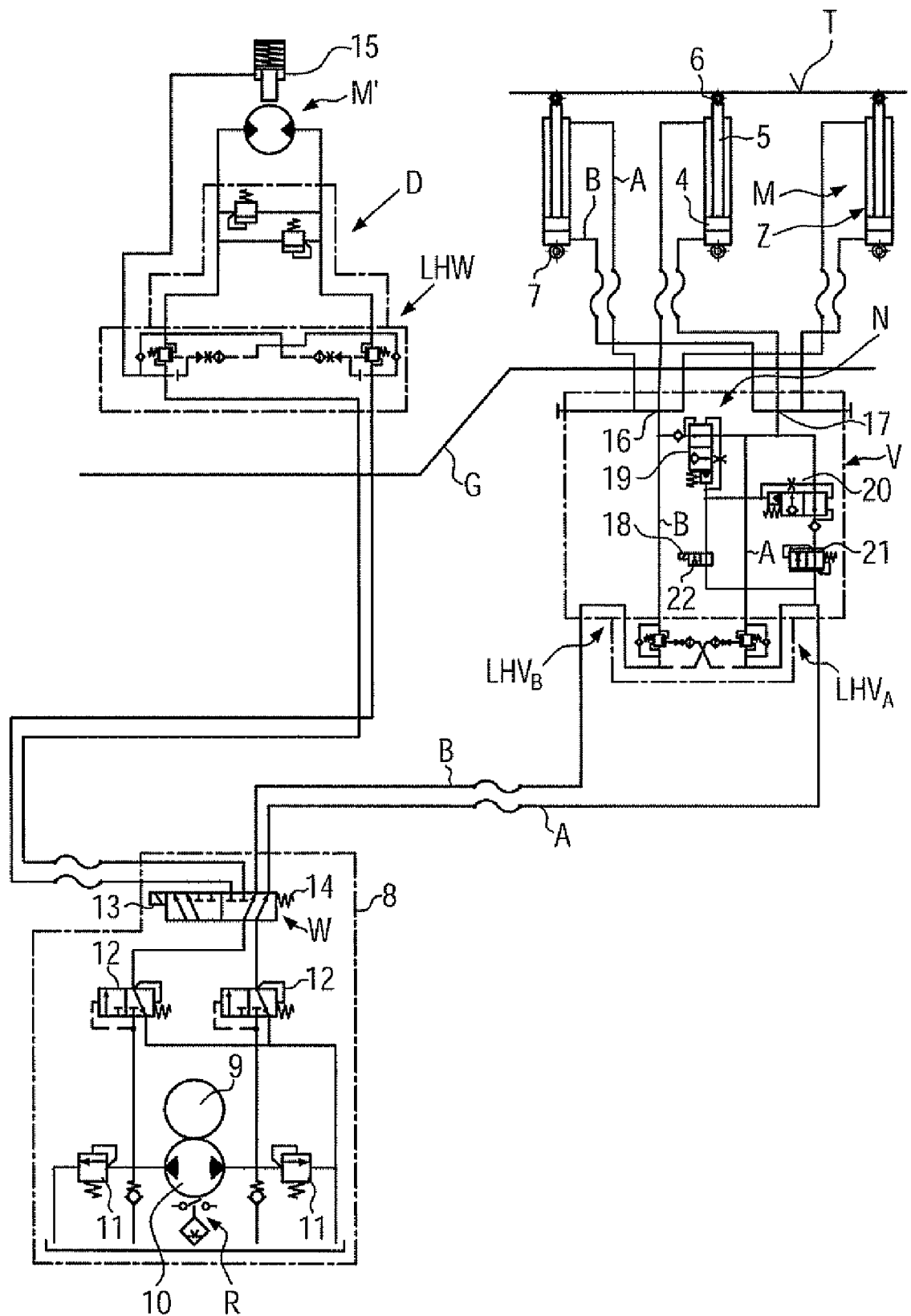
FIG. 2 is a block diagram of an electrohydraulic solar panel carrier adjusting device, in pressureless condition.

An electrohydraulic solar panel carrier adjusting device E including the rotation control system D and the tilt control system K, shown as a block diagram in FIG. 2, is part of the solar panel unit of FIG. 1. The electrohydraulic adjusting device E serves to move the carrier T to track the path of the sun by rotating the carrier T in steps about the axis 3 and by tilting the carrier T in steps in the suspensions 2. Furthermore, the adjusting device E serves to adjust the carrier T into the protected position S, namely for safety reasons whenever an electric power breakdown occurs or when the electric power is switched off intentionally.

FIG. 2 shows three hydrostatic tilt motors M circuited in parallel, i.e. differential cylinders Z, for the carrier T. The piston rods 5 engage at the suspension 7 at the carrier T. The differential cylinders Z are supported at the sub-structure U at the suspension 6. Each hydrostatic tilt motor M is double-actuated. The piston side chamber and the piston rod side chamber of each hydrostatic tilt motor M are commonly connected by working lines A, B to a motor pump aggregate 8. A valve block V is contained in the working lines A, B. The valve block V either is directly mounted at the hydrostatic tilt motors M or (as shown) is mounted in immediate vicinity to the hydrostatic tilt motors M, e.g. at amounting interface G. The valve block V contains a suction line N serving to move the carrier T from the respectively adjusted tilt position to the protected position S. The suction line N, monitored by a monitoring solenoid 18, either is closed or open depending on the energization or de-energization of the monitoring solenoid 18. The working lines A, B respectively are interconnected at nodes 16, 17 in the valve block V, and, furthermore, are connected via blocking valves or load holding valves $LHV_A$, $LHV_B$ with a directional control slider valve W contained in the motor pump aggregate 8. The directional control slider valve W is a ⅔-way slider valve and is held by a spring 14 in the shown switching position where it is connected to the valve block V. The directional control slider valve W may be switched over by a then energized switching solenoid 13 into another working position for then being connected to the rotation control system D, but returns automatically to the shown switching position when the switching solenoid 13 is de-energized.

An e.g. double-actuated hydrostatic rotation motor M' for rotating the column 1 is provided in the rotation control system D. A brake 15 for fixing the column 1 in the respectively adjusted rotary position may be associated to the column 1. The brake 15 is engaged by spring force and is disengaged hydraulically. Furthermore, blocking valves or load holding valves LHV are arranged in each working line which hydraulically block the rotation of the hydrostatic rotation motor M' and hold the load pressure when the rotation control system D is de-activated.

A reversible electric motor 9 is contained in the motor pump aggregate 8 and drives a pump 10 which discharges hydraulic medium in both rotary directions. The motor pump aggregate 8 may be arranged at a significant distance from the rotation control system D and the tilt control system K. The system pressures in each pumping direction of the pump 10 are limited by a system pressure limiting valve 11. Pilot pressure operated 3/2-way valves 12 either establish a connection between the pump 10 and one working line A or B and between one working line B or A and a tank R.

Two pilot pressure operated multi-way seat valves, namely 2/2-way seat valves 19, 20, a 2/2-way solenoid seat valve 22, the actuator of which is constituted by the monitoring solenoid 18 of the suction line N, and optionally, a lowering brake valve 21 are contained in the valve block V. The lowering brake valve 21, if provided, serves to limit the speed when the carrier T moves from an adjusted position into the protected position S. The tilt control system K shown in FIG. 2 will be explained in detail with the help of FIG. 3

Figure 3:
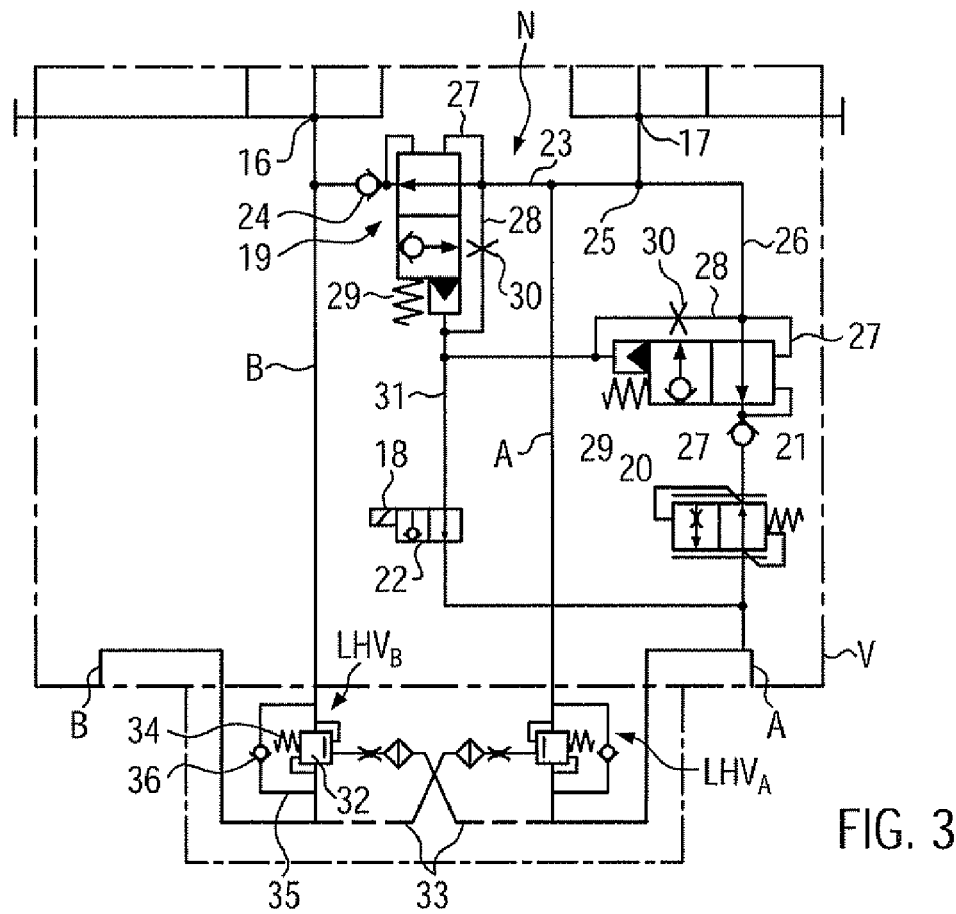
FIG. 3 is a tilt control system of the adjusting device of FIG. 2 as a block diagram in enlarged scale.

A suction path 23 is provided in FIG. 3 between the working lines A, B. The working lines A, B extend from the nodes 16, 17 to the blocking valves or load holding valves $LHV_B$, $LHV_B$. A discharge line 26 branches off from the suction path 23 at a node 25. The discharge line 26 extends to the 2/2-way seat valve 20, to a check valve 27' blocking in flow direction towards the node 17, and to the optionally provided lowering brake valve 21 and directly leads to a section of the working line A which section extends from the load holding valve $LHV_A$ to the motor pump aggregate 8. The discharge line 26 connected to this section thus deviates the blocking valve or load holding valve $LHV_A$.

The 2/2-way seat valve 20 is pilot operated by pilot pressure taken from the discharge line 26. In particular, a pilot line 27 extends from the discharge line 26 to an opening control side of a valve closure member (not shown) of the 2/2-way seat valve 20, while a pilot line 28 extends from the discharge line 26 to a closing control side of the same valve closure member. An aperture 30 is provided in the pilot line 28. Furthermore, the closure member is urged in closing direction at the closing control side by a schematically indicated closing spring 29. In analogous fashion the 2/2-way seat valve 19 in the suction path 23 between the nodes 25, 16 is pilot pressure operated via pilot lines 27, 28 extending from the suction path 23 to the opening control side and the closing control side of the closure member of the 2/2-way seat valve 19. The pilot line 28 contains an aperture 30.

The suction path 23 contains downstream of the 2/2-way seat valve 19 a check valve 24 blocking in flow direction to the node 25. In an alternative (not shown) the check valves 27, 24 instead could be arranged at the respective other sides of the 2/2-way seat valves 19, 20.

The closing control sides (the pilot lines 28) of both multi-way seat valves 19, 20 are commonly connected via an unloading branch 31 to the discharge line 26 downstream of the lowering brake valve 21. The unloading branch 31 only has to pass through small pilot quantities. The 2/2-way solenoid seat valve 22 is located in the unloading branch 31. The actuator of the 2/2 solenoid seat valve 22 is the monitoring solenoid 18 of the suction line N. As long as the monitoring solenoid 18 is energized, the solenoid seat valve 22 holds a blocking or closed position. When the electric power is switched off or in case of an electric power breakdown the 2/2-way solenoid seat valve 22 maintains the shown open position, e.g. by virtue of a valve spring.

The pressure receiving surfaces loaded by the respective pilot pressures at the opening control side and the closing control side of the closure members in both pilot pressure operated multi-way seat valves 19,20 may have different sizes. Furthermore, the size of the aperture 30 is smaller than the cross-section of the open solenoid seat valve 22. For example, the size of the aperture 30 substantially corresponds to a bore having a diameter of 0.4 mm, while the cross-section of the open solenoid seat valve 22 corresponds to a bore having a diameter of 0.7 mm to 0.8 mm.

Each blocking valve or load holding valve $LHV_B$, $LHV_A$ is held by a spring 39 in a load holding position. The spring 34 engages at a closure member 32. The spring 34 e.g. limits a load pressure of 180 bar. The closure member 32 can be brought into an open position via pilot pressure in a pilot line 32 extending to the respective other working line A or B. This means that the closure member 32 of the blocking valve or load holding valve $LHV_B$ is brought into an open position by pilot pressure in the pilot line 33 taken from the pressure in the working line A. The closure member 32 of the blocking valve or load holding valve $LHV_A$ is brought into an open position by pilot pressure in the pilot line 33 extending to the working line B. In addition, each blocking valve or load holding valve $LHV_A$, $LHV_B$ is deviated by a line loop 35 containing a check valve 36 which opens in flow direction to the respective node 16, 17, and which blocks in the opposite flow direction.

Function in FIGS. 1, 2 and 3:

As long as electric power is not switched off intentionally, or is not absent due to an electric power breakdown, the adjusting device E is operating normally (standby operation or active operation), the monitoring solenoid 18 is energized. The monitoring solenoid 18 e.g. has a power consumption of only about 1.5 volt to 6.0 volt, preferably of only about 3 volt.

The solenoid seat valve 22 then is in the blocking position. The unloading branch 31 upstream of the solenoid seat valve 22 contains pilot pressure such that both multi-way seat valves 19, 20 hold the blocking positions. The suction path 23 is blocked, as also the discharge line 26 between the node 25 and the section of the working line A extending to the motor pump aggregate 8. The load pressure at the nodes 16, 17 is held by the blocking valves or load holding valves $LHV_A$, $LHV_B$, which both are in blocking position. The switching solenoid 13 of the directional control slider valve W is de-energized, meaning that the directional control slider valve W maintains the switching position shown in FIG. 2, by virtue of the valve spring 14. The respective sections of the working lines A, B are connected to the tank R via the pilot pressure operated 3/2-way valve 12.

In some cases a certain elevated basic pressure may be maintained between the 3/2-way valve 12, the system pressure limiting valve 11, and the pump 10.

If now a rotation adjustment step is needed in the rotation control system D, the switching solenoid 13 has to be energized temporarily and the pump 10 will be driven in the respectively required rotation direction in order to carry out the rotation adjustment step. Thereafter, the switching solenoid 13 is de-energized. The directional control slider valve W automatically switches over to the position shown in FIG. 2.

If now a tilt adjustment step is needed, e.g. requested by an inclination sensor, an electric power gain sensor and/or a time switch RT (FIG. 2), the pump 10 will be driven in the respective direction needed for the step, e.g. to extend the piston rod 5 of the hydrostatic tilt motors M. Pressure has to be built-up at the node 17, and the working line A while hydraulic medium has to be discharged via the node 16 from the working line B. The discharge pressure of the pump 10 switches the pilot pressure operated 3/2-way valve 12 on the right side in the motor pump aggregate 8 into the open position. Hydraulic medium flows via the check valve of the blocking valve or load holding valve $LHV_A$ (in FIG. 3 on the right side) to node 17 and then through the node 17 into the piston side chambers. At the same time hydraulic medium from the piston rod side chambers is discharged via the node 16 to the tank R until a new desired position of the carrier is established. Displaced hydraulic medium passes the blocking valve load holding valve $LHV_B$, shown on the left side which is opened by pilot pressure in the pilot line 33 from the pressurized working line A, and flows through the directional control slider valve W and the 3/2-way valve 12 shown on the left side in FIG. 2 to the tank R. Then the electric motor 9 is stopped. The hydrostatic tilt motors M are blocked hydraulically. The suction path 23 is kept blocked by the multi-way seat valve 19. The discharge line 26 is kept blocked by the multi-way seat valve 20.

In order to carry out a tilting adjustment step in the opposite direction of the hydrostatic tilt motors M (to retract the piston rods 5) the above-mentioned steps are carried out in reverse. Instead, the electric power may be switched-off temporarily by intention to control this tilting adjustment step without primary electric energy.

In case of danger, e.g. caused by strong winds, the power supply may intentionally be switched off totally. The consequence of switching of the power supply is the same as in case of an electric power breakdown caused for other reasons. Namely, the monitoring solenoid 18 then is de-energized such that the solenoid seat valve 22 automatically moves into the open position. The switching solenoid 13 then is already de-energized as well. The electric motor 9 has stopped. The load pressure of the carrier T acts in retracting direction on the piston rods 5 of the differential cylinders Z, i.e., the pressure in the piston side chambers (at node 17) exceeds the pressure in the piston rod side chamber (at node 16). By virtue of the apertures 30 and thanks to the now opened and pressure relieved unloading branch 31 the increased pressure at node 17 operates the multi-way seat valves 19, 20 to open, since the respective pilot pressure at the opening control side is higher than the pilot pressure at the closing control side of the closure member. Hydraulic medium flows from the node 17 through the suction path 23 into the piston rod side chambers, while at the same time (different volumes of the piston side chambers and the piston rod side chambers) a part of the hydraulic medium is directly discharged through the discharge line 26, the open check valve 27, and the optionally provided lowering brake valve 21 into the section of the working line A extending to the motor pump aggregate 8. This part of the hydraulic medium then reaches the tank R in the motor pump aggregate 8 through the 3/2-way valve shown on the right side. The lowering speed of the carrier T is limited by the lowering brake valve 21 or is regulated to a constant value, irrespective of whether or not the load pressure is varying. The carrier T finally either reaches a new desired position or reaches the protected position S, e.g. defined by not shown stops, or defined by an abutment (form-fit) of the piston 4 of the differential cylinder Z in the end position. In this condition the piston side chambers and the piston rod side chambers and in the valve block V well-defined hydraulic conditions are present (equal pressures or equal pressure relieved conditions) which is important for restarting normal operation of the electrohydraulic adjusting device E at a later time. To achieve the protected position S it has not been necessary to draw in hydraulic medium through long flow distances from the motor pump aggregate 8.

As soon as normal operation is started again, with the carrier T in the protected position S, e.g. the next day, upon energization of the monitoring solenoid 18 the 2/2-way solenoid seat valve 22 is closed, while the 2/2-way seat valves 19, 20 are held in the blocking positions by the valve springs 29.

Figure 4:
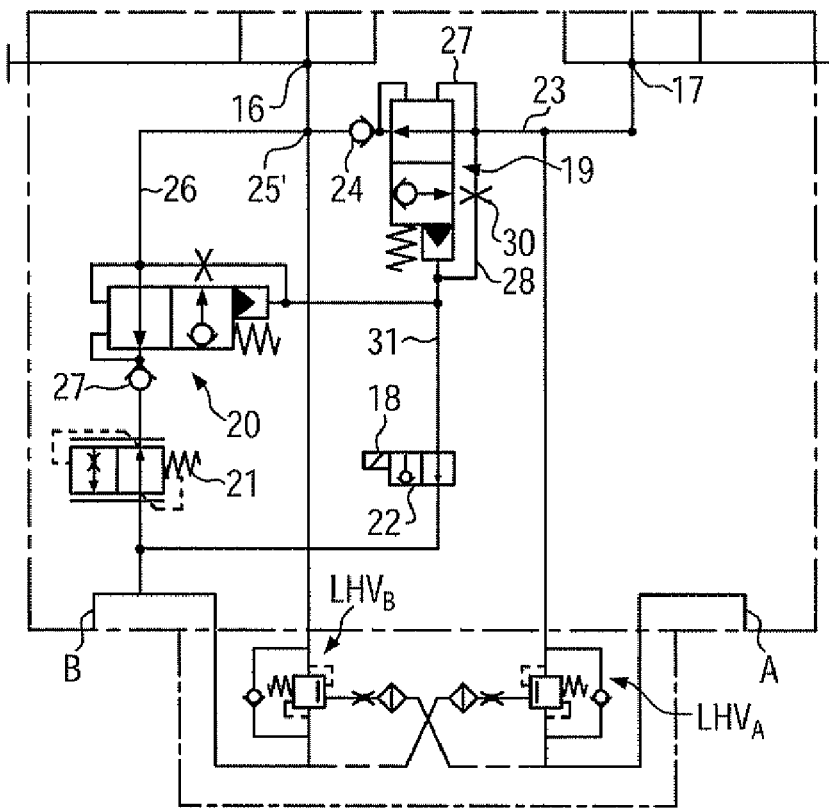
FIG. 4 is a variant of the tilt control system of FIG. 3.

The variation shown in FIG. 4 differs from the embodiment of FIG. 3 in that the discharge line 20 beginning at the node 25' situated below the node 16 is connected to the section of the other working line B extending from the load holding valve $LHV_B$ to the motor pump aggregate 8. The discharge line 26 deviates the blocking valve or load holding valves $LHV_B$ on the left side in FIG. 4. The unloading branch 31 containing the solenoid seat valve 22 with the monitoring solenoid 18 is connected to the discharge line 26. The function is the same.

In the case that the pilot pressure receiving surfaces of the respective valve closure members in the 2/2-way seat valves 19, 20 are designed with different sizes, it is possible to switch the valves 19, 20 more forcefully and truly pressure dependent from the open position into the blocking position and vice versa.

The power consumption of the monitoring solenoid 18 amounts to, as mentioned, only about 3.0 volt, while the power consumption of the switching solenoid 13 in the motor pump aggregate 8 may amount to about 8.0 volt. The discharge capacity of the pump 10 may amount to about 3.5 l/min. The system pressure may be limited to about 150 bar. The nominal speed of the electric motor 9 may be 1360 rpm at a power consumption of 0.75 KW. The volume of the tank R only needs to amount to about 5 litres.

The valve block V is a prefabricated unit which either is directly mounted at the hydrostatic tilt motors M, or which is mounted at the mounting interface G, which is provided as close as possible at the hydrostatic tilt motors M. The sections of the working lines A, B between the valve block V and the motor pump aggregate 8 may be as long as needed.

In the shown embodiment the differential cylinders Z tilting the carrier T are switched in parallel and are connected to a common tilt control system K. In a not shown alternative, however, each of the several differential cylinders Z may have a separate tilt control system K either corresponding to the one shown in FIG. 3 or the one shown in FIG. 4.

The invention claimed is:

1. Electrohydraulic adjusting device (E) for a solar panel carrier (T) which, at least for tracking the position of the sun, is rotatable and tiltable at a sub-structure (1, U) by means of double-actuated hydrostatic rotation and tilt motors (M, M') and selectively is tiltable such that the carrier (T) tends to automatically reach a protected position (S) without actuation by the hydrostatic tilt motor (M), comprising a motor pump aggregate (8) connected to the hydrostatic rotation and tilt motors (M, M') and a control system comprising valve components at least for a tilt control, the control system containing pressure controlled blocking valves or load holding valves ($LHV_A$, $LHV_B$) in working lines (A, B) at least of the at least one hydrostatic tilt motor (M), wherein for automatically adjusting the protected position (S) of the carrier (T) a suction line (N) is provided at the side of the hydrostatic tilt motor (M) facing to the blocking valves or load holding valves ($LHV_A$, $LHV_B$), that the suction line (N) is adapted to be controlled open only pressure dependently in case of a power switching off condition and/or an electrical power breakdown, that the suction line (N) is controlled by a monitoring solenoid (18) between an open state and a closed state, that between the hydrostatic tilt motor (M) and the blocking valves or load holding valves ($LHV_A$, $LHV_B$) the working lines (A, B) are interconnected by a suction path (23), that a discharge line (26) branching off from the suction path (23) is deviating the blocking valves or load holding valves, that a respective pilot pressure operated multi-way seat valve (19, 20) is arranged in the suction path (23) and in the discharge line (26), the respective multi-way seat valve (19, 20) being pilot pressure operated with pilot pressures taken from the suction path (23) and the discharge line (26), that a pilot circuit of both multi-way seat valves (19, 20) is connected by an unloading branch (31) to the discharge line (26), and that a solenoid seat valve (22) is arranged in the unloading branch (31), the solenoid seat valve (22) having the monitoring solenoid (18) as a valve actuator for bringing the solenoid seat valve (22) into a blocking position.

2. Electrohydraulic adjusting device according to claim 1, wherein the monitoring solenoid (18) has a power consumption between about 1.5 volt to about 6.0 volt, and that the monitoring solenoid (18) is permanently energized during normal operation of the adjusting device (E).

3. Electrohydraulic adjusting device according to claim 1, wherein the hydrostatic tilt motor (M) is a differential cylinder (Z), the piston rod (5) of which in the protection position (S) is retracted into a form-fit abutment, that the suction line (N) is opened in suction direction from a piston side chamber to a piston rod side chamber, that the discharge line (26) deviates the blocking valve or load holding valve in the working line (A, B) either connected to the piston side chamber or the piston rod side chamber.

4. Electrohydraulic adjusting device according to claim 1, wherein the suction path (23) and the discharge line (26) respectively contain a check valve (24, 24') blocking in flow direction to the piston side chamber.

5. Electrohydraulic adjusting device according to claim 1, wherein a lowering brake valve (21) is installed in the discharge line (26).

6. Electrohydraulic adjusting device according to claim 1, wherein at least the suction line (N) and the monitoring solenoid (18) are provided in a valve block (V) also containing the blocking valves or load holding valves, and that the valve block (V) is mounted either directly at the hydrostatic tilt motor (M) or in immediate vicinity of the hydrostatic tilt motor (M).

7. Electrohydraulic adjusting device according to claim 1, wherein each multi-way seat valve (19, 20) contains a closure member which is loaded in opening direction at an opening control side and in closing direction at a closing control side on pressure receiving surfaces of different sizes by pilot pressure taken from the suction path (23) and the discharge line (26), that the closure member, is urged by a valve spring (29) in closing direction, that an aperture (30) is installed between the suction path (23) and the discharge line (26), respectively, and the closing control side of each multi-way seat valve (19, 20), that the closing control sides of both multi-way seat valves (19, 20) are connected via an unloading branch (31) to the solenoid seat valve (22) which unloading branch (31) leads to a section of the working line (A, B) extending to the motor pump aggregate (8), and that a cross-section of the open solenoid seat valve (22) is larger than the size of the respective aperture (30).

8. Electrohydraulic adjusting device according to claim 7, wherein the size of the aperture (30) corresponds to a bore of a diameter of about 0.4 mm, and that the cross-section of the open solenoid seat valve (22) corresponds to a bore of a diameter of about 0.7 mm to 0.8 mm.

9. Electrohydraulic adjusting device according to claim 1, wherein the motor pump aggregate (8) comprises a reversible electric motor (9) and a pump (10) which discharges in both senses of rotation, a pair of pilot pressure operated ⅔-way valves (12), a system pressure limiting valve (11) and a solenoid actuated directional control slider valve (W), that the working lines (A, B) extend to a tilt control system (K) of the hydrostatic tilt motor (M), and that further working lines extends to a rotation control system (D) of the carrier (T), and that the power consumption of the solenoid (13) of the directional control slider valve (W) amounts to about 5 to 10 volt.

10. Electrohydraulic adjusting device according to claim 1, wherein several hydrostatic tilt motors (M) are provided, that the hydrostatic tilt motors (M) are switched in parallel, and that the hydrostatic tilt motors (M) either are connected to a common tilt control system (K) or have separate tilt control systems (K).

11. Electrohydraulic adjusting device according to claim 2 wherein the wherein the monitoring solenoid (18) has a power consumption of about 3 volt.

12. Electrohydraulic adjusting device according to claim 3 wherein the discharge line (26) is connected to a section of the respective working line (A or B) extending between the blocking valve or load holding valve and the motor pump aggregate (8).

13. Electrohydraulic adjusting device according to claim 9 wherein the power consumption of the solenoid (13) of the directional control slider valve (W) amounts to about 8 volt.

\* \* \* \* \*